(12) United States Patent
Lyons

(10) Patent No.: US 9,027,883 B2
(45) Date of Patent: May 12, 2015

(54) AIRCRAFT FAIRING

(75) Inventor: Neil John Lyons, Bristol (GB)

(73) Assignee: Airbus Operations Limited, Bristol (GB)

( * ) Notice: Subject to any disclaimer, the term of this patent is extended or adjusted under 35 U.S.C. 154(b) by 145 days.

(21) Appl. No.: 13/127,606

(22) PCT Filed: Nov. 5, 2008

(86) PCT No.: PCT/GB2008/051028
§ 371 (c)(1),
(2), (4) Date: May 4, 2011

(87) PCT Pub. No.: WO2010/052446
PCT Pub. Date: May 14, 2010

(65) Prior Publication Data
US 2011/0204185 A1 Aug. 25, 2011

(51) Int. Cl.
*B64C 7/00* (2006.01)
*B64C 23/04* (2006.01)

(52) U.S. Cl.
CPC .. *B64C 7/00* (2013.01); *B64C 23/04* (2013.01)

(58) Field of Classification Search
USPC .............. 244/200, 130, 131, 119, 129.1, 198
See application file for complete search history.

(56) References Cited

U.S. PATENT DOCUMENTS

| | | | |
|---|---|---|---|
| 2,927,749 A | 3/1960 | Brownell | |
| 4,314,681 A | 2/1982 | Kutney | |
| 4,624,425 A | 11/1986 | Austin et al. | |
| 4,643,376 A * | 2/1987 | Vanderhoeven | 244/198 |
| 5,749,542 A | 5/1998 | Hamstra et al. | |
| 6,854,687 B1 | 2/2005 | Morgenstern et al. | |
| 2003/0066933 A1 | 4/2003 | Maury et al. | |
| 2005/0116107 A1 | 6/2005 | Morgenstern et al. | |
| 2006/0006287 A1 * | 1/2006 | Ferguson et al. | 244/130 |
| 2006/0065784 A1 * | 3/2006 | Rouyre | 244/119 |
| 2009/0078830 A1 | 3/2009 | Fol et al. | |

FOREIGN PATENT DOCUMENTS

| | | |
|---|---|---|
| EP | 0810357 A1 | 12/1997 |
| FR | 2892999 A1 | 5/2007 |

OTHER PUBLICATIONS

International Search Report for PCT/GB2008/051028, mailed May 28, 2009.
H. Sobieczky "Configuration test cases for aircraft wing root design and optimization", 1998, International Symposium on inverse Problems in Engineering Mechanics (ISIP 98) Mar. 1988, Nagano, Japan.
Search Report corresponding to GB0526208.4, dated Mar. 31, 2006.
Additional Search Report corresponding to GB0526208.4, dated Oct. 18, 2006.

* cited by examiner

*Primary Examiner* — Troy Chambers
*Assistant Examiner* — Jamie S Stehle
(74) *Attorney, Agent, or Firm* — Lowe Hauptman & Ham, LLP

(57) ABSTRACT

A shock control fairing for mounting a junction between adjoining aircraft surfaces. The fairing has a cross-sectional profile which varies along the length of the fairing. The cross-sectional profile of the fairing has a maximum area at a location which, when mounted to an aircraft, is substantially proximal to a location on the surface of the aircraft at which a shock would be expected to develop without the fairing.

5 Claims, 6 Drawing Sheets

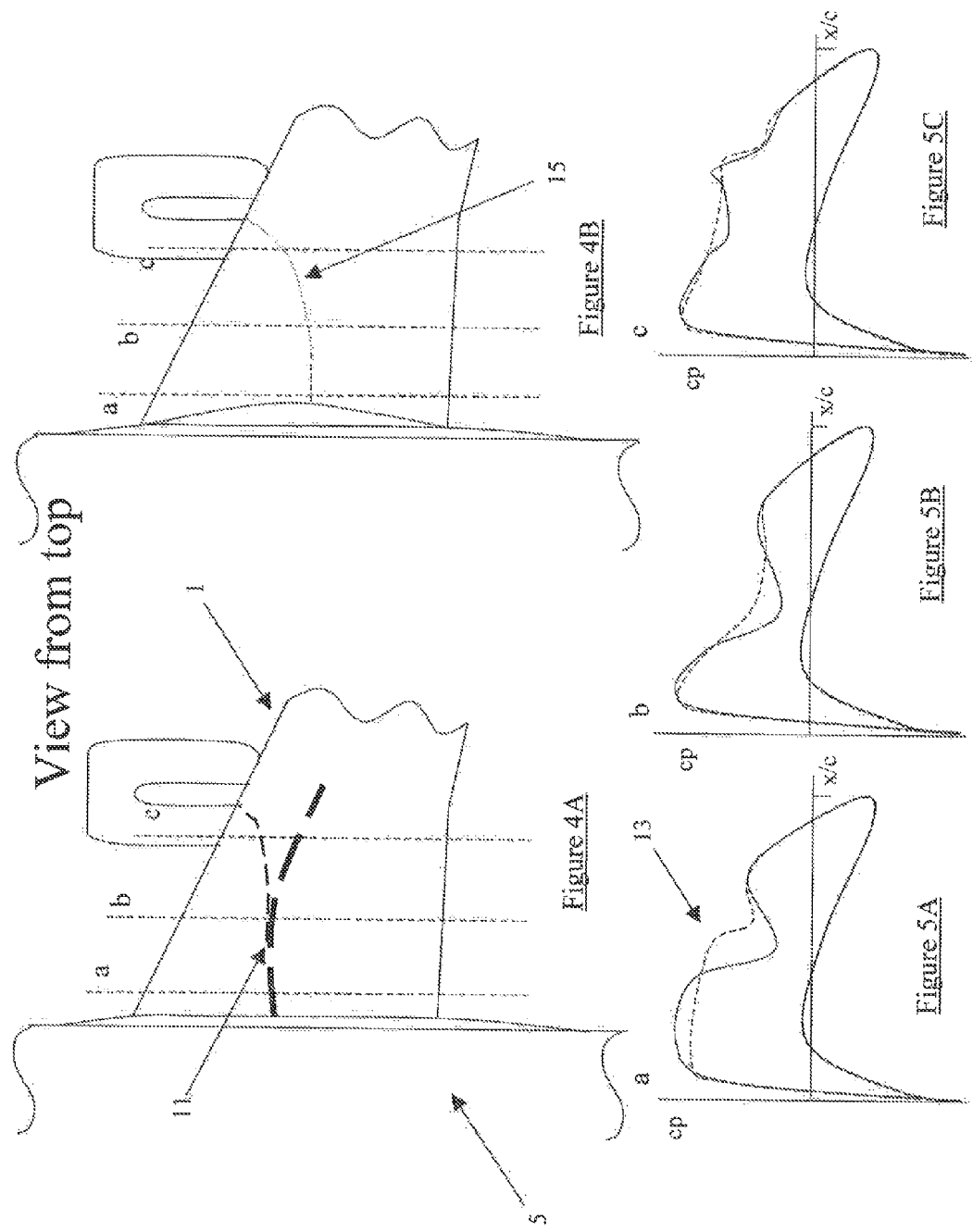

AIRCRAFT FAIRING

RELATED APPLICATIONS

The present application is national phase of PCT/GB2008/051028 filed Nov. 5, 2008.

FIELD OF THE INVENTION

The present invention relates to a fairing, and more particularly to a shock control fairing for mounting on the upper surface of a junction between an aircraft fuselage and wing.

BACKGROUND TO THE INVENTION

As shown in FIG. 1, many aircraft include a fairing at the upper surface 203 of a junction between the aircraft fuselage 205 and wing 201 (i.e. the upper surface of the wing root). One function of such fairings is to reduce or eliminate separation of the airflow in the region of the junction and thereby reduce viscous drag on the aircraft.

A typical prior art wing root fairing 209 is in the form of a concave, wedge-shaped fillet (the upper surface of the which is represented by the mesh in FIG. 1). The fillet starts at a mid-chord region of the wing root and extends to a maximum cross-sectional area at, or slightly aft of, the trailing edge of the wing root. These known fairings are referred to herein as a "conventional wing root fairing".

When aircraft operate at transonic speeds, at least one shock may develop in the region of the wing root and/or over the upper surface of the inner wing. The shock may be undesirable for a number of reasons. For example, the shock can cause considerable wave drag and may also limit the amount of lift that the inner region of the wing generates.

Embodiments of the present invention seek to provide a fairing for an aircraft, which removes or mitigates at least one of the above-mentioned problems.

SUMMARY OF THE INVENTION

According to a first aspect of the present invention, there is provided a shock control fairing for mounting on a junction between aircraft components;
the fairing having a cross-sectional profile which varies along the length of the fairing;
wherein the cross-sectional profile has a maximum area at a location which, when mounted to an aircraft, is substantially proximal to a location on the surface of the aircraft at which a shock would be expected to develop without the fairing.

The shock control fairing may be arranged for mounting on the upper surface of a junction between an aircraft fuselage and wing;
wherein the cross-sectional profile has a maximum area at a location which, when mounted to an aircraft, is substantially proximal to a location on the upper surface of the aircraft wing at which a shock would be expected to develop without the fairing.

The shock control fairing may also be arranged to reduce or eliminate separation or the airflow in the region of the junction.

In use, the shock control fairing is arranged such that its length extends along a substantially chordwise direction of the aircraft wing root. Accordingly, it will be appreciated that the plane of the cross-sectional profile of the fairing may be substantially aligned in a spanwise plane.

In some embodiments the cross-sectional profile may have a maximum area at a location which, when mounted to an aircraft, substantially coincides with the location at which a shock would be expected to develop without the shock control fairing.

As will be appreciated by a person skilled in the art, locations on the upper surface of the wing at which a shock would be expected to develop can be easily determined for any given aircraft.

For example, the flow over the upper surface of a wing, without a fairing according to the invention, may be measured, modelled, or calculated by known techniques (for example using wind tunnel testing or Computational Fluid Dynamics) to determine the shock locations. Once the shock locations have been determined, a fairing having a cross-sectional profile in accordance with embodiments of the invention may be provided. Depending upon the initial configuration of the aircraft, determining the locations on the upper surface of the wing at which a shock would be expected to develop may comprise analysing the flow over the upper surface of the wing with a prior art wing root fairing.

For some aircraft a shock may be expected to occur at several locations on the upper surface. Accordingly, the maximum area of the cross-sectional profile may be provided proximal to a location at which the most significant shock would occur. A shock may, for example, be considered significant if it is the shock which has the greatest effect on the lift and/or drag of the wing. Alternatively or additionally, a shock may for example be considered significant if it accounts for more than one tenth of a percent of the total aircraft drag.

An aircraft provided with a shock control fairing according to an embodiment of the invention has been found to generate a number of advantageous effects on the flow field surrounding the inner wing and the junction. Providing a fairing having a maximum area at a location which is substantially proximal to a location on the upper surface of the aircraft wing at which a shock would be expected to develop without the fairing present is thought to modify the pressure gradients that arise in the vicinity of the junction during flight.

As will be understood by the person skilled in the art, the spanwise direction extends from the fuselage to the wing tip, and is perpendicular to the longitudinal direction such that the wing tip is at 100% span and the longitudinal centre-line of the aircraft is at 0% span.

As will also be understood by the person skilled in the art, the wing root chord is the value of the chord at the wing root. On many aircraft, the geometry of the wing and/or the fuselage may be such that the spanwise position of the wing root varies between the leading edge and the trailing edge of the wing. In such circumstances, it will be understood that the wing root chord refers to the chord at the spanwise location on the wing that coincides with the point on the junction lying furthest from the centre-line of the aircraft.

On a typical transonic passenger aircraft wing a significant shock may be found to occur proximal to a mid chord region of the wing root junction. Accordingly in some embodiments, the shock control fairing is arranged such that, when mounted to an aircraft, with its length extending along a chordwise direction of the aircraft wing root, the cross-sectional profile has a maximum area in a mid-chord region of the wing root. For example, the cross-sectional profile may have a maximum area located between 20% wing root chord and 70% wing root chord. In some embodiments the cross-sectional profile may have a maximum area located between 30% wing root chord and 50% wing root chord.

The fairing may be blended at one end, and more preferably both ends, with an aircraft belly fairing.

The fairing may have an upper surface arranged to extend, when mounted to an aircraft, between an aircraft fuselage and an upper surface of an aircraft wing. Part of the surface may be substantially flat or concave. At least part of the surface may be convex in the a spanwise plane and/or in a chordwise plane.

The curvature of the upper surface of the fairing may vary along its length so as to vary the cross-sectional profile of the fairing. For example the radius of the curvature of the surface may vary at different points along the length of the fairing. For example the curvature of the surface may be greatest at the location where the fairing has the maximum cross-sectional area.

In some embodiments the curvature may vary between a concave, flat and/or convex curvature along the length of the fairing. The upper surface may, for example, have a convex curvature at the location at which the cross-sectional profile has a maximum area.

A convex fairing may be particularly advantageous since the span wise extent of the fairing is relatively small, whilst still providing a volume so shaped that the fairing has the desired effect on local shock formations.

The fairing may be bulbous in shape, in that for example the fairing includes a bulged region. The fairing may for example generally increase in cross-sectional area along its length to a maximum cross-sectional area and then generally decrease. The fairing may be generally elongate in shape. At least 70% of the total volume of the fairing may be located between 20% and 70% wing root chord In other embodiments at least 70% of the total volume of the fairing may be located between 20% and 50% wing root chord.

The fairing may taper at one or both ends. The cross-sectional area of the fairing, in a spanwise plane, may taper to less than 5% of the maximum cross-sectional area of the fairing in a spanwise plane. The fairing may be fully blended, at one or both ends, with another feature of the aircraft, for example the fuselage, or the belly fairing.

The fairing may be defined such that at least one point in the volume of the fairing:
  (i) is located above the junction by a height H, measured perpendicular to the upper surface;
  (ii) is separated from the junction along the upper surface by a spanwise distance D1; and
  (iii) is separated from the junction in a direction perpendicular to the length of the fairing and at 45 degrees to the upper surface by a distance D2.

At least one point in the volume of the fairing meeting the above criteria may lie in the plane where the cross-sectional profile of the fairing has a maximum cross-sectional area. The point may lie on the outer surface of the fairing.

The height H may be between 0.2% wing root chord and 1.5% wing root chord. Spanwise distance D1 may be between 1.5% wing root chord and 7% wing root chord. D2 may be between 1.5% wing root chord and 8% wing root chord.

The height H may be between 0.5% wing root chord and 1% wing root chord. Spanwise distance D1 may be between 2.5% wing root chord and 3.5% wing root chord. D2 may be between 3% wing root chord and 4% wing root chord.

For example, H may be at least 0.5% wing root chord, D1 may be at least 3% wing root chord and D2 may be at least 3% wing root chord. For example, H may be at least 0.5% wing root chord, D1 may be at least 3.0% wing root chord and D2 may be at least 3.3% wing root chord. For example, H may be at least 0.6% wing root chord, D1 may be at least 3.2% wing root chord and D2 may be at least 3.5% wing root chord.

The fairing may be used to cover, store, or house, various aircraft equipment. For example, the fairing may house an oil cooler, or an air conditioning pack.

The aircraft may be an aircraft designed to travel at transonic speed. The present invention is generally of greater application to larger aircraft. The aircraft may be heavier than 50 tonnes dry weight, and more preferably heavier than 200 tonnes dry weight. The aircraft may be of a size equivalent to an aircraft designed to carry more than 75 passengers., and more preferably more than 200 passengers.

According to another aspect of the invention there is provided a method of designing a shock control fairing for mounting on the upper surface of a junction between an aircraft fuselage and wing, the method comprising the steps of
  (iv) determining the location at which a shock would be expected to develop on the upper surface of the aircraft wing without the provision of a shock control fairing;
  (v) defining the geometry of the shock control fairing such that the fairing has a cross-sectional profile which varies along the length of the fairing has a maximum area arranged to be proximal to said shock location.

The step of determining the location at which a shock would be expected to develop may comprise: providing a model of at least part of an aircraft, the model comprising at least part of a wing, at least part of a fuselage and a junction of the wing and fuselage; and modelling the flow field over the model. The step of defining the geometry of the shock control fairing may comprise: modifying the geometry of the junction of the wing and fuselage; and modelling the flow field over the modified geometry model.

The method may be carried out using as an iterative process so as to optimise the advantages provided by the shock control fairing. Accordingly the method may comprise repeating the steps of modifying the geometry of the junction of the wing and fuselage; and modelling the flow field over the modified geometry model; until the flow field over the modified geometry model, when compared to flow field over the unmodified model, has at least one of the following differences:
  (a) a decrease in the sweep angle of at least part of the first shock wave relative to the flow direction,
  (b) a decrease in the strength of at least part of the first shock wave, and/or
  (c) the replacement of at least part of the first shock wave with a substantially isentropic recompression.

The skilled person will appreciate that the method may be carried out by empirical or analytical techniques. In some embodiments a computer model of the aircraft may be used and the flow may be modelled using Computational Fluid Dynamics.

A method may further comprise the step of manufacturing a shock control fairing substantially in accordance with the defined geometry and, optionally, fitting the shock control fairing to an aircraft.

It will be appreciated that the shock control fairing according to any embodiment of the invention may be incorporated into a new aircraft design. Therefore, the fairing may be an integral part of the aircraft, for example it may be formed as part of the upper surface of the aircraft wing or as a part of the fuselage. In other embodiments the shock control fairing may be retro fitted onto the junction of an existing aircraft and may, therefore, be provided as a discrete component.

It will be understood that features described with reference to the fairing, aircraft or method according to one aspect of the present invention are equally applicable to the fairing, aircraft or method according to any another aspect of the present invention and vice versa. For example, the geometry of the modified computer model may be such that, if a fairing in accordance with the modified computer model were installed on an aircraft including a wing and a fuselage having a geometry in accordance with said computer model of at least part of an aircraft, the aircraft including the fairing would be substantially in accordance with the fairing of the invention as described herein.

DETAILED DESCRIPTION OF AN EMBODIMENT

An embodiment of the invention will now be described, by way of example only, with reference to the accompanying schematic drawings of which:

FIGS. 4a and 4b are schematic plan views of the inner wing region showing the typical shock pattern of an aircraft fitted with a known conventional wing root fairing and part of the aircraft according to an embodiment of the invention;

FIGS. 5a to 5c are plots showing the chordwise pressure distribution at three stations along the wing of the aircraft according to the first embodiment of the invention;

Figure 1:
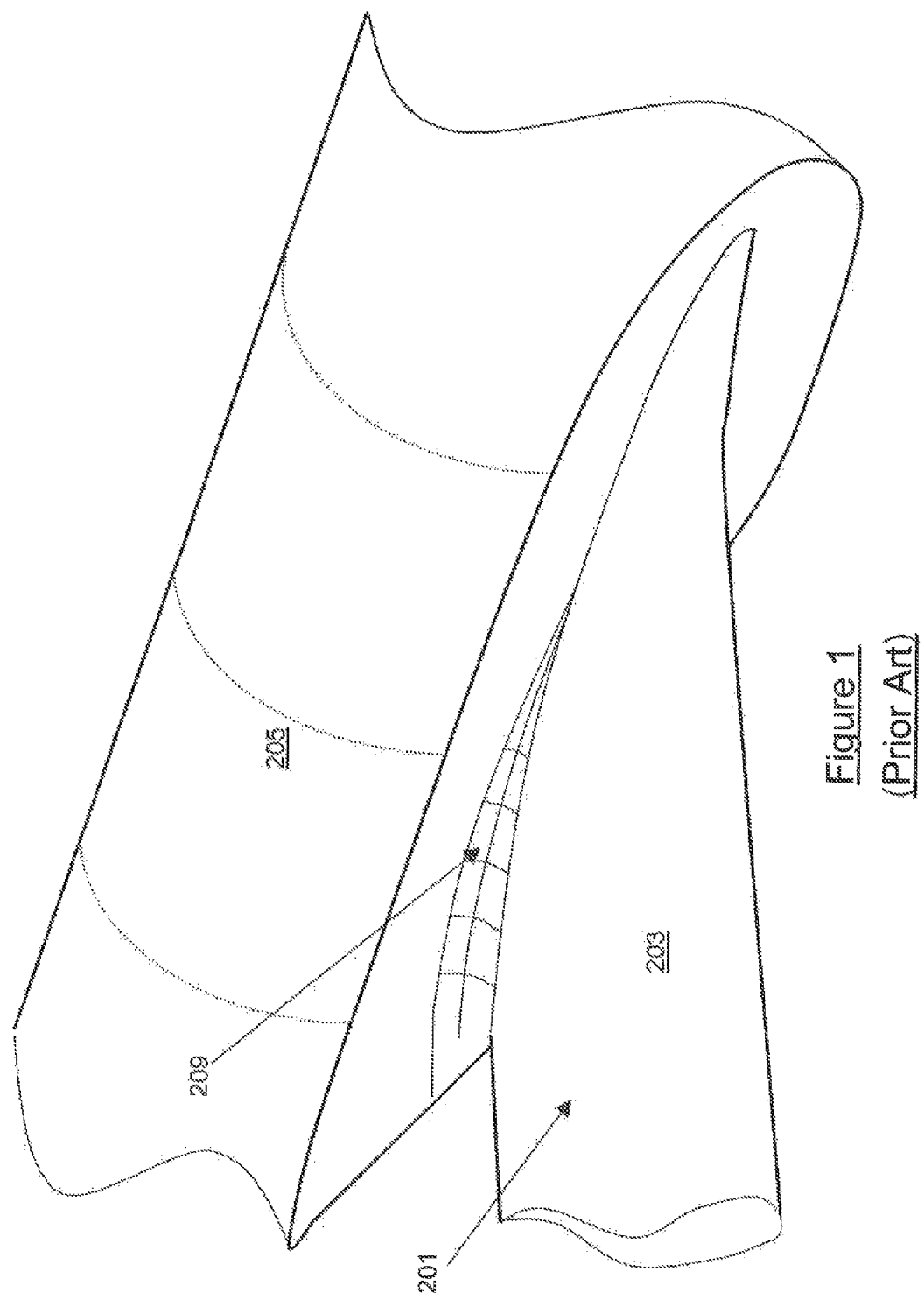
FIG. 1 is a perspective view of representing the arrangement of a typical prior art wing root fairing.

As described above FIG. 1 represents a conventional wing root fairing. The skilled person in the art will appreciate that many aircraft include such a fairing located on the upper surface of the junction between the fuselage and wing. Such conventional wing root fairings are provided to control boundary layer separation in the junction region and, thereby reduce the occurrence of resulting vortices and drag. A conventional wing root fairing is typically, and in the present context it may be assumed to be, substantially in accordance with the following exemplary definition. The conventional wing root fairing is triangular or concave in cross-section and so shaped that at least 90% of the volume of the conventional wing root fairing is located between 50% chord and the trailing edge of the wing. The cross-sectional area of the conventional wing root fairing increases linearly between 60% chord and the trailing edge (100% chord) of the wing. The cross-sectional area of the fairing tapers from zero in the region between the leading edge (0% chord) of the wing and 60% chord. In other words, the cross-sectional area of a conventional wing root fairing varies along the length of the fairing and has a minimum cross-sectional area (for example, zero) at the leading edge and, in direct contrast to the present invention, has a maximum cross-sectional area at, or close to, the trailing edge.

Figure 2:
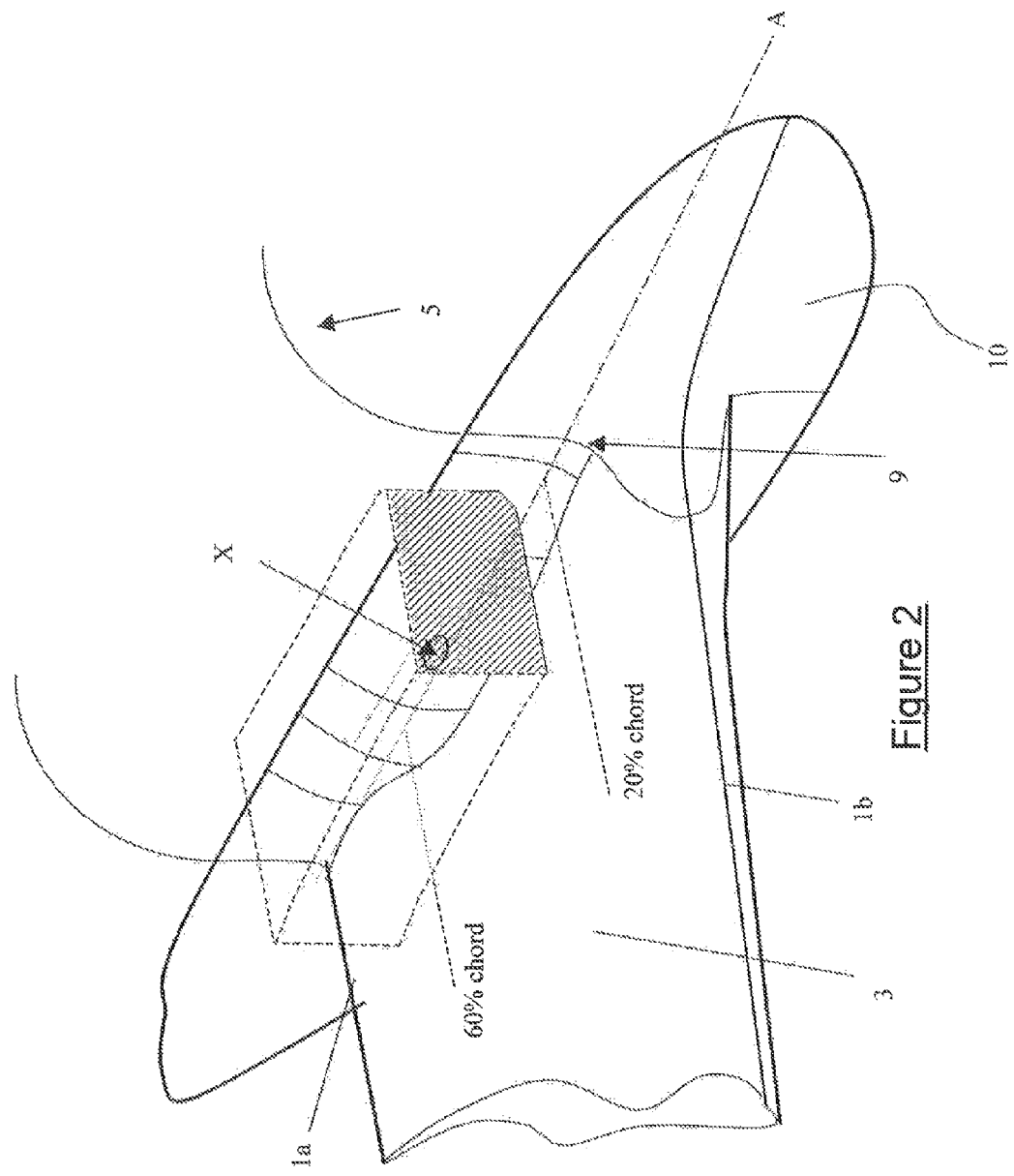
FIG. 2 is a perspective view of part of the aircraft according to the first embodiment of the invention.
Figure 3:
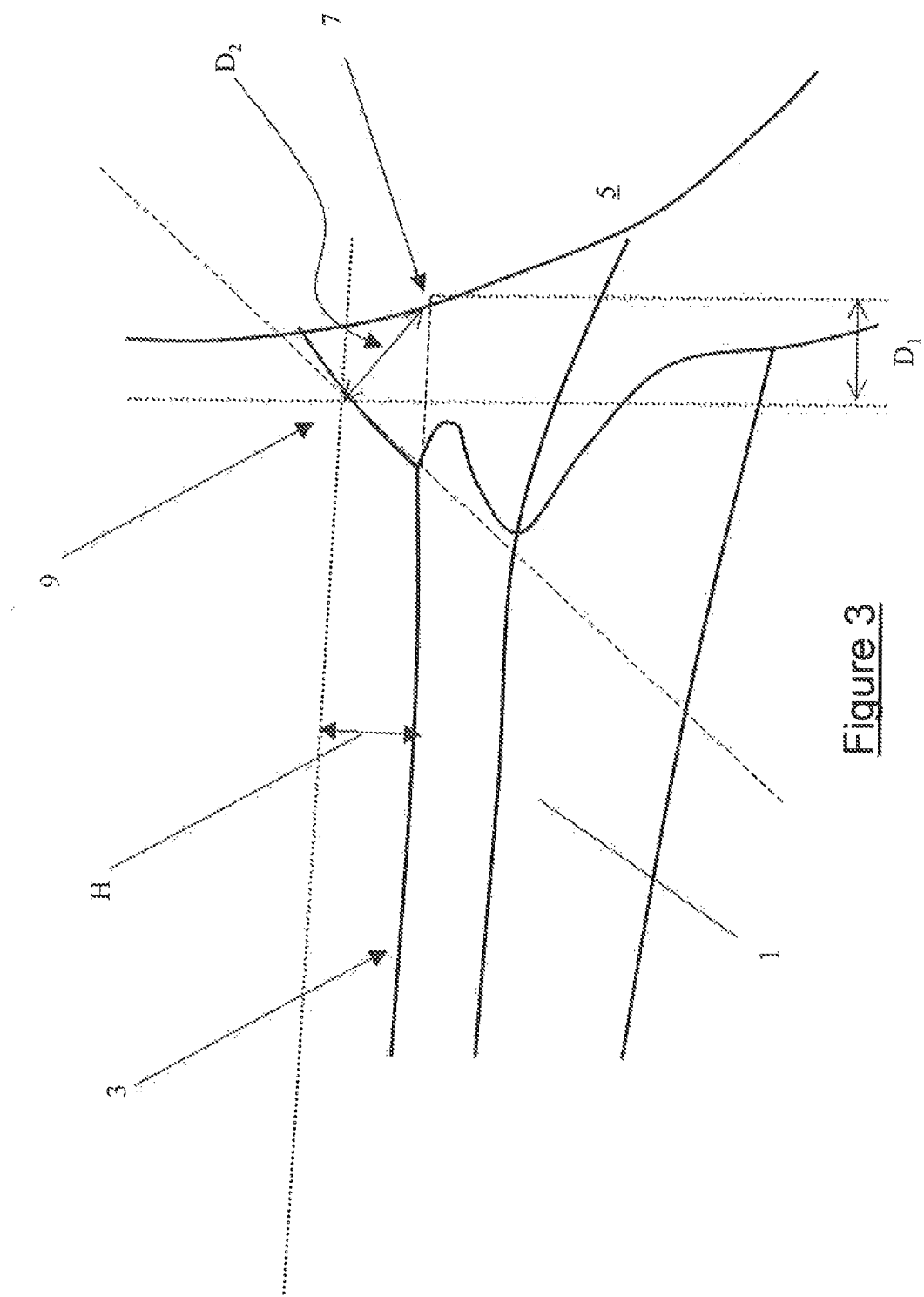
FIG. 3 is a front view of part of an aircraft according to a first embodiment of the present invention.

Referring to FIGS. 2 and 3, an aircraft according to a an embodiment of the invention comprises a wing 1 having an upper surface 3 which forms a junction 7 with the fuselage 5 at the wing root. The aircraft also comprises a bulbous, generally convex fairing 9 (shown as a computer generated mesh) located on the upper surface 3 of the wing 1 at the junction 7. The fairing is hollow and may house aircraft systems, for example an air-conditioning unit (not shown).

The fairing 9 extends between leading edge 1b and trailing edge 1a of the wing 1 and tapers at either end so as to be blended with the belly fairing 10. The cross-sectional profile of the fairing varies along the length of the fairing (as seen most clearly in FIG. 6) and has a maximum area in the mid-chord region of the wing (where the fairing appears noticeably bulged). 70% of the total volume of the fairing is located between approximately 30% wing root chord and 70% wing root chord (it will be understood by the skilled man that chord measurements are made from the leading edge 1b of the wing, thus the leading edge 1b is at 0% chord and the trailing edge 1a is at 100% chord).

The fairing has a surface that, at one point, is convex in both the spanwise and chordwise planes. This point is located at approximately 40% wing root chord (i.e. where, had the aircraft been fitted with a conventional wing root fairing, a shock would have developed (see FIG. 4a)).

The aircraft of the first embodiment represents a typical short to medium range, narrow-body, commercial passenger aircraft having a nominal wing root chord of 6 m. Due to the incidence of the wing and the shape of the fuselage, the junction 7 is closer to the centre-line of the aircraft at the wing trailing edge 1a than at the wing leading edge 1b. The wing root chord is the chord at the spanwise location on the wing that coincides with the point on the junction 7 lying furthest from the centre-line of the aircraft (the notional line showing this spanwise location being labelled with the letter 'A' in FIG. 2).

In the first embodiment of the invention, part of the fairing 9 extends between 20% and 60% wing root chord.

A region X on the part of the fairing 9 between 20% and 60% wing root chord also lies at a height H of more than 0.5% wing root chord (approximately 3 cm) above the upper surface 3 of the wing 1. In addition, this region X of the fairing 9 lies more than a distance $D_1$ of 3.0% wing root chord (approximately 18 cm) in a spanwise direction from the junction. Furthermore, this region X of the fairing 9 is located more than a distance $D_2$ of 3.3% wing root chord (approximately 20 cm) in a direction perpendicular to the longitudinal direction and at +45 degrees to the horizontal plane, from the junction 7.

This region X of the fairing 9 also lies at a height H of less than 1.0% wing root chord(approximately 6 cm) above the upper surface 3 of the wing 1, and less than a distance D1 of 6.0% wing root chord (approximately 36 cm) in a spanwise direction from the junction.

FIG. 2 shows the notional volume (not necessarily to scale) in which the at least one point in the fairing 9, and more specifically in the above-mentioned region X, lies. The volume has been shaded for the sake of clarity. FIG. 3 shows the dimensions D1, D2 and H that may be used to define the location of the at least one point in the fairing 9, relative to the junction 7.

FIG. 4a shows the location at which shockwave 11 would be expected to occur on an aircraft which is fitted with a conventional wing root fairing. The position of the shockwaves as shown was determined by calculating the flowfield using Computational Fluid Dynamics software. The flow conditions used had a free stream flow of approximately Mach 0.8 and an aircraft lift coefficient of approximately 0.5. The flowfield was shown to contain a shock 11 at approximately 40 to 25% chord (the chordwise position of the shock 11 changing along the span of the wing). It will be appreciated that the relative strength of the shock 11 is illustrated in the figure by the thickness of the representative line. The shock 11 gives rise to pressure drag and a loss of lift over the downstream region of the wing 3.

FIG. 4b shows shockwave locations on part of the aircraft according to the first embodiment of the invention. The flow conditions are the same as those in FIG. 4a, but the flowfield is clearly different. The presence of the fairing modifies the airflow and gives rise to beneficial effects such as reducing shockwave strength resulting in reduced wave drag while still controlling separation of flow in the region of the junction (in the substantially the same manner as a conventional wing root fairing).

Most notably, the shock 11 is substantially reduced along virtually all the inner region of the wing 1 and the remaining inner weak wing shock 15 is moved aft, towards the training edge 1a.

FIGS. 5a to 5c show the chordwise pressure distribution at spanwise locations (shown in FIGS. 4a and 4b as lines a, b and c) moving away from the wing root. The pressure distribution on the aircraft with the conventional wing root fairing is indicated by the solid black line, and the pressure distribution on the aircraft according to an embodiment of the present invention is shown by the dashed line. Referring to FIG. 5a, it can clearly been seen from the location of the sharp pressure increase 13, that on the aircraft of the present invention the shock 15 is further aft in the portion of the wing close to the wing root, relative to the shock 11 on the wing fitted with the conventional wing root fairing. This is beneficial as it extends the region of low pressure on the upper surface of the wing, thus increasing lift.

FIG. 5b shows the pressure distribution a little further outboard along the wing. On the aircraft comprising the conventional wing root fairing, there is a significant increase in the upper surface pressure at approximately 25% chord. This sharp rise is caused by the shock 11. However, on the aircraft according to embodiments of the present invention, the shock 11 has been replaced by a substantially isentropic recompression. The pressure thus gradually increases between 20% and 50% chord. The aircraft therefore experiences significantly less wave drag than the same aircraft comprising the conventional wing rot fairing. This region of the wing 1 also generates more lift than the corresponding region of the aircraft wing with the conventional wing root fairing.

FIG. 5c shows the pressure distribution yet further out on the wing. At this point the fairing has less effect on the flowfield and the pressure distribution is similar to that on the known aircraft. There is, nevertheless, a slight increase in the roof-top length on the upper surface of the wing of the aircraft according to the present invention, and thus an increase in the aircraft lift.

Figure 6:
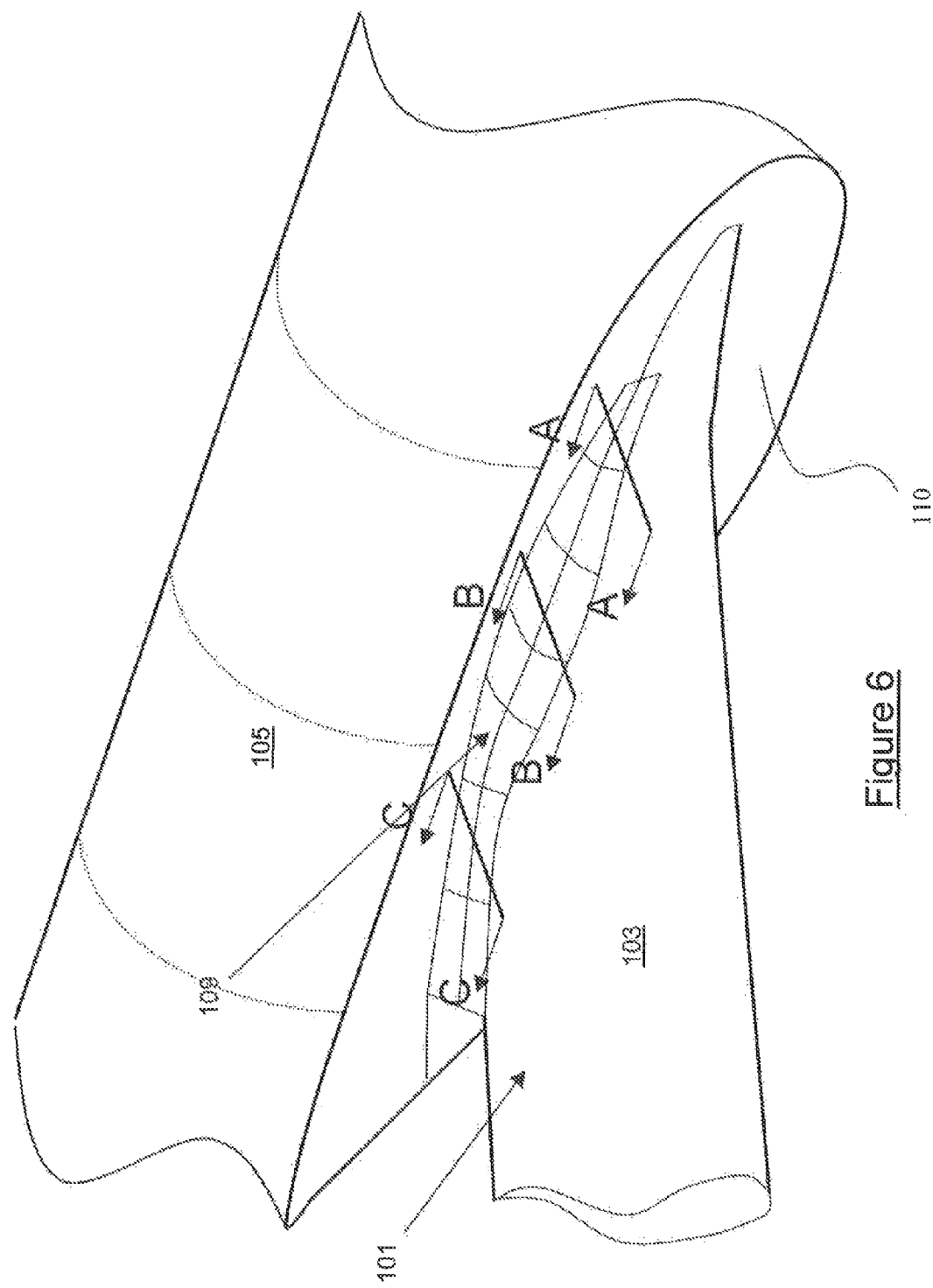
FIG. 6 is a perspective view of part of an aircraft according to an embodiment of the invention and FIG. 7 illustrates the variation of the cross-sectional area of a shock control fairing according to an embodiment of the invention and a traditional wing root fairing.

FIG. 6 is a perspective view of part of an aircraft according to a second embodiment of the invention. The aircraft comprises a wing 101 having an upper surface 103 which forms as junction with the fuselage 105 at the wing root. The aircraft also comprises a fairing 109 (shown in FIG. 6 as a computer generated mesh) located on the upper surface 103 of the wing 101 at the junction.

Figure 7:
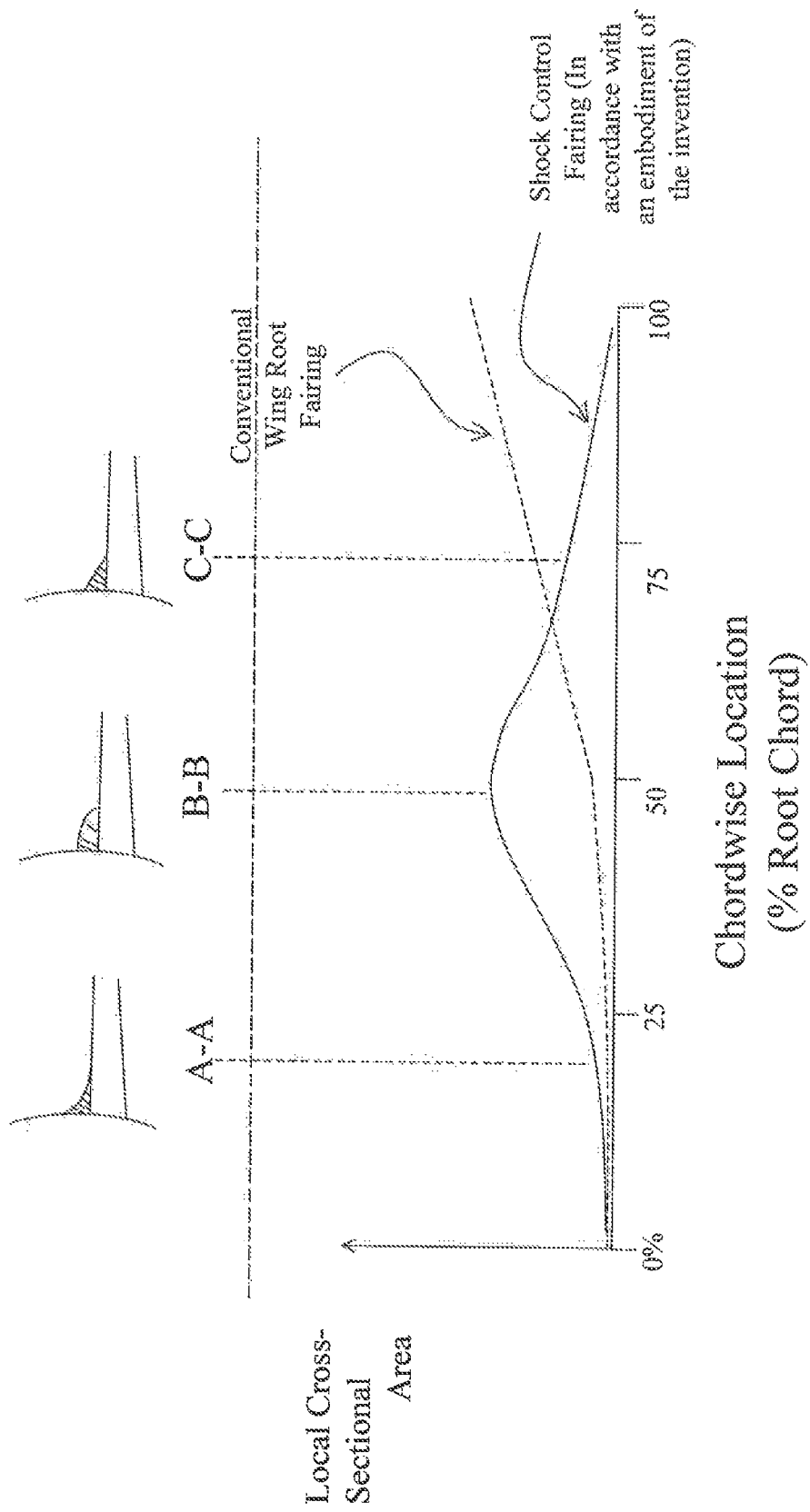

FIG. 7 represents a comparison of the variation of the cross-sectional area of a shock control fairing according to the embodiment of FIG. 6 relative to a conventional wing root fairing. The cross-sectional area of the conventional fairing (dashed line) can be seen to increase from a minimum at the wing leading edge (0% root chord) to a maximum at the wing trailing edge (100% root chord). The fairing according to an embodiment the invention has a maximum cross-sectional area in the mid-chord region with the area increasing along the length of the wing root from the trailing edge to the mid-chord region and then decreasing from the maximum area toward the trailing edge.

FIG. 7 also shows representative cross-sections of the wing root fairing at the locations indicated by the lines A-A, B-B and C-C on FIG. 6. These locations respectively correspond to approximately 20% root chord, 45% root chord and 70% root chord. The Cross-sectional profile of the fairing at section A-A has a relatively small cross-sectional area. The upper surface of the fairing at section A-A has a concave curvature. The Cross-sectional profile of the fairing at section B-B has a relatively large cross-sectional area and approximately corresponds to the maximum cross-sectional area of the fairing. The upper surface of the fairing at section B-B has a convex curvature. The Cross-sectional profile of the fairing at section C-C has a relatively small cross-sectional area but has a slightly larger area than that of section A-A. The upper surface of the fairing at section C-C a substantially neutral (i.e. flat) curvature. The cross sectional area for each cross section is indicated on the graph. Thus, it can be seen that the spanwise curvature of the upper surface of the fairing may be varied in order to provide the desired local cross-sectional area.

The aircraft of the second embodiment represents a typical medium to long range, wide-body, commercial passenger aircraft having a nominal wing root chord of 10 m. Part of the fairing 109 lies between 20% and 40% wing root chord, at a height H of more than 0.6% wing root chord(approximately 6 cm) above the upper surface of the wing 101, more than a distance $D_1$ of 3.2% wing root chord(approximately 32 cm) in a spanwise direction from the junction, and more than a distance $D_2$ of 3.5% wing root chord(approximately 35 cm) in a direction perpendicular to the longitudinal direction and at +45 degrees to the horizontal plane, from the junction 7.

The fairing tapers to zero cross-section at approximately 10% wing root chord and blends with the belly fairing 110 at the trailing edge of the wing. 70% of the total volume of the fairing is located between approximately 20% wing root chord and 50% wing root chord.

In order to confirm that embodiments of the invention may be advantageous on a variety of aircraft, the flowfield around the wing of FIG. 6 was calculated using Computational Fluid Dynamics code. These calculations were performed in an identical manner to that of the field for FIGS. 4 and 5 but with a slightly higher free stream flow and aircraft lift coefficient, as appropriate for a wide body commercial aircraft.

The results of this analysis (not shown) supported those shown in FIGS. 4 and 5. Specifically, the flow field for a wide-body aircraft having a conventional wing root fairing was found to contain a forward shock at approximately 25% chord, and an aft shock located at approximately 75% chord. In contrast, the flowfield for the aircraft according to the second embodiment of the invention showed that the forward shock was removed, and replaced by a small shock created close to the fairing.

The chordwise pressure distribution plots at closely spaced spanwise locations along the wing of the aircraft according to the second embodiment of the invention were compared to the pressure distribution on several aircraft with conventional wing root fairings in the same manner as described above with reference to FIG. 5. Although the suction peak on the wing of the aircraft according to the second embodiment was slightly less than that on some of the aircraft with known wing root fairings, the roof top length was considerably longer and at lower pressure, giving greater lift.

CFD calculations indicate that for a typical wide-body commercial aircraft, embodiments of the present invention may gives rise to a drag reduction of approximately 2.5% of aircraft drag in comparison with some known aircraft configurations. At a typical design cruise speed there was found to be a reduction of approximately 2% of aircraft drag. At a slightly higher cruise speed there was found to be a reduction of approximately 4% of aircraft drag.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

It will be appreciated that while embodiments have been described above with reference to aircraft representing a typical short to medium range, narrow-body, commercial passenger aircraft and a typical medium to long range, wide-body, commercial passenger aircraft, the invention is not limited to such aircraft. The skilled person would appreciate that embodiments of the invention may be advantageous in any aircraft where a shock would normally develop on the upper surface of the aircraft wing during flight.

Furthermore, while embodiments of the invention have been described with reference to the junction between an aircraft wing and fuselage, it will be appreciated that the invention may be of benefit at other junctions where a shock might otherwise form on the surface of the aircraft. For Example embodiments of the invention may be used at the junction between the engine pylon and the lower surface of the wing or between a wing tip and a winglet. Embodiments of the invention may for example be of benefit where two aircraft surfaces form an approximately perpendicular junction.

It will of course be appreciated that the values of D1, D2 and H mentioned above could be different in relation to the same fairing. Also, the shape of the fairing that produces the best results on a given aircraft, in terms of shifting or removing shocks observed in (computer models of) large aircraft at transonic speeds could vary from one aircraft to another. Thus, for certain aircraft sizes and shapes the values of D1, D2 and H could be lower or higher than those mentioned above in relation to the drawings.

Comparing an aircraft having a fairing according to an embodiment of the invention to an aircraft having an unmodified configuration, which includes a conventional wing root fairing, embodiments of the present invention may benefit from one or more of the following aerodynamic effects during flight:
- at least one less shock may be generated in the region of the junction;
- at least one shock may be replaced by a substantially isentropic recompression;
- at least one shock may be moved aft;
- a similar number of shocks may be generated, but at least one shock may be moved aft;
- the angle of at least one shock to the flow direction may be reduced (i.e. the component of the shock normal to the flow direction, may be reduced).

An embodiment of the present invention may thereby allow the wave drag, experienced by an aircraft during use, to be reduced. In addition, the roof top length of the wing surface may be increased, thereby generating improved lift from the inner region of the wing. The above-mentioned effects on the flow field may be assessed using a Computational Fluid Dynamics (CFD) code, for example using an unstructured mesh Navier Stokes code.

The invention claimed is:

1. An aircraft comprising an elongate shock control fairing mounted on the upper surface of a junction between the aircraft fuselage and wing, the fairing comprising a fixed outer surface arranged to extend between the fuselage and the upper surface of the wing, and the length of the fairing extending along a chordwise direction of the aircraft wing root,
   wherein the curvature of the outer surface of the fairing varies along the length of the fairing, such that the fairing comprises
   a fore-region having concave curvature,
   a mid-region having convex curvature, and
   an aft-region having neutral curvature,
   and wherein the area of the cross-sectional profile of the fairing generally continually increases from the fore-region of the fairing towards the mid-region of the fairing, reaching a maximum area in the mid-chord region of the wing root, and then generally decreases from the mid-region of the fairing towards the aft-region of the fairing, the fairing being shaped such that the maximum area of the cross-sectional profile of the fairing is at a location within the mid-chord region of the wing root which is substantially proximal to a location on the surface of the aircraft at which a shock would be expected to develop without the fairing during transonic flight.

2. An aircraft as claimed in claim 1, wherein the maximum cross-sectional area substantially coincides with the location at which a shock would be expected to occur.

3. An aircraft as claimed in claim 1, wherein location on the surface of the aircraft at which a shock would be expected to develop without the fairing is the location at which the most significant shock would occur.

4. An aircraft as claimed in claim 1, wherein at least 70% of the volume of the total volume of the fairing is located between 20% and 70% wing root chord.

5. An aircraft as claimed in claim 1, wherein at least one point in the volume of the fairing:
   (i) is located above the junction by a height H, measured perpendicular to the upper surface of the aircraft wing;
   (ii) is separated from the junction along the upper surface of the aircraft wing by a spanwise distance D1; and
   (iii) is separated from the junction in a direction perpendicular to the length of the fairing and at 45 degrees to the upper surface of the aircraft wing by a distance D2;
wherein
   H is between 0.2% wing root chord and 1.5% wing root chord; D1 is between 1.5% wing root chord and 7% wing root chord; and D2 is between 1.5% wing root chord and 8% wing root chord.

* * * * *